No. 816,841. PATENTED APR. 3, 1906.
R. M. BEDELL.
LINOTYPE MACHINE.
APPLICATION FILED SEPT. 12, 1905.
2 SHEETS—SHEET 1.
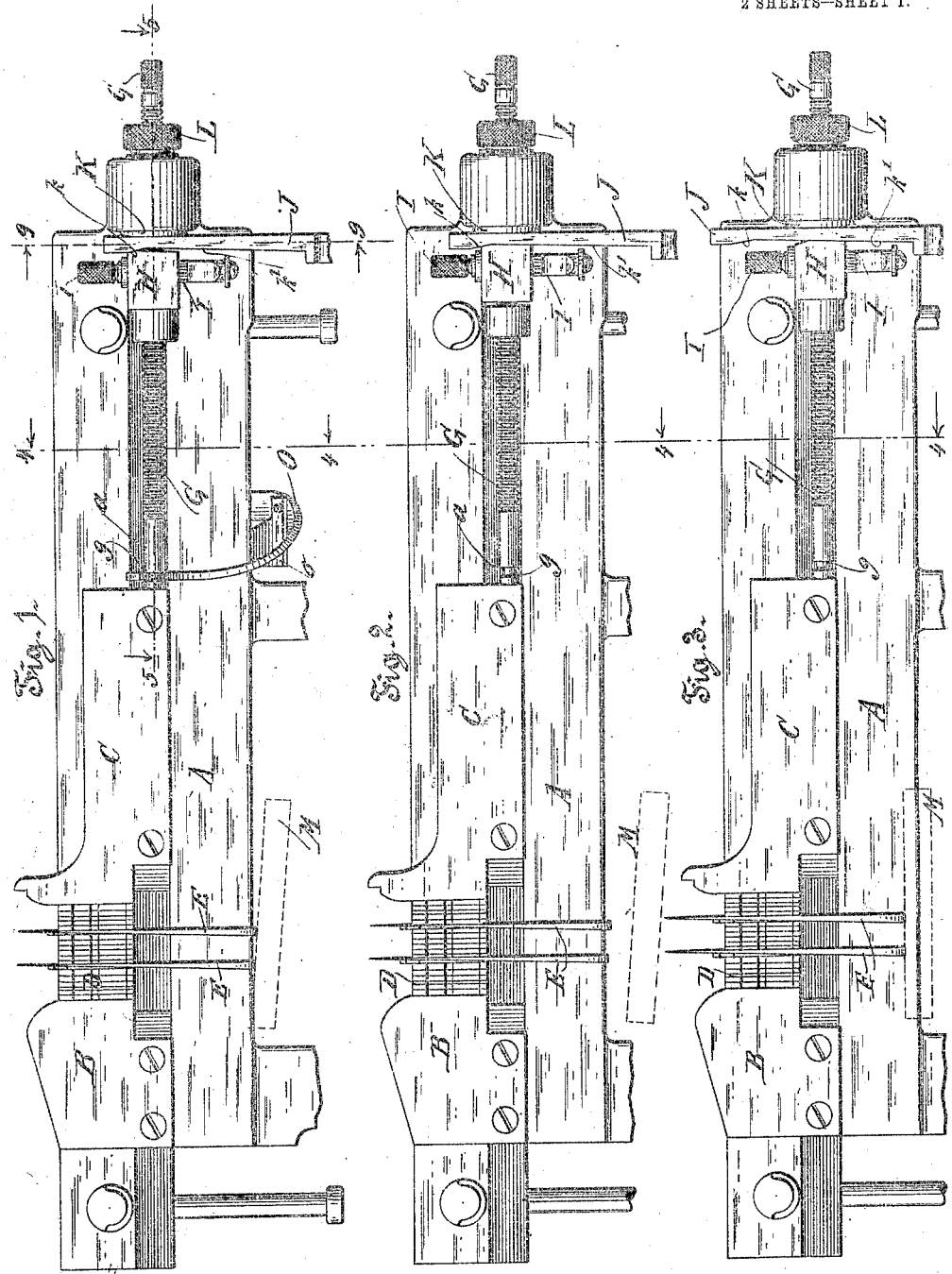

No. 816,841. PATENTED APR. 3, 1906.
R. M. BEDELL.
LINOTYPE MACHINE.
APPLICATION FILED SEPT. 12, 1905.
2 SHEETS—SHEET 2.
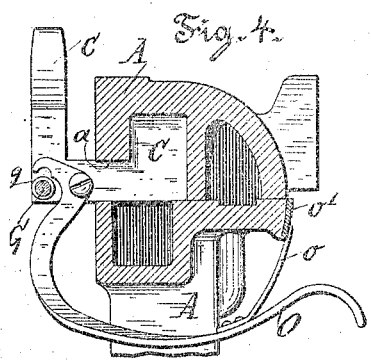
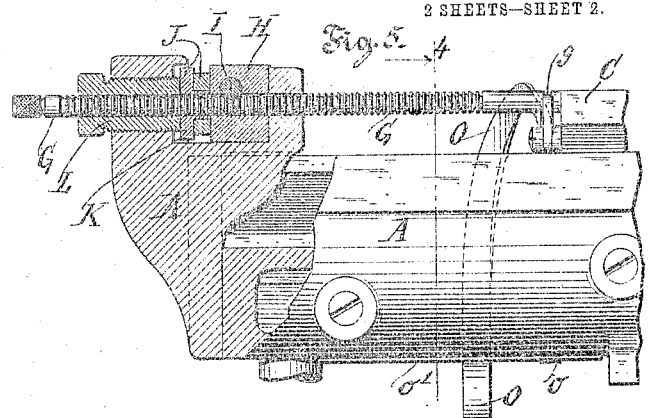
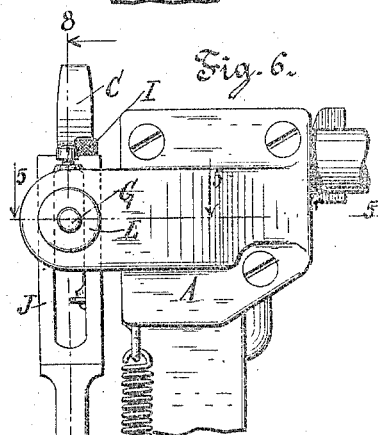
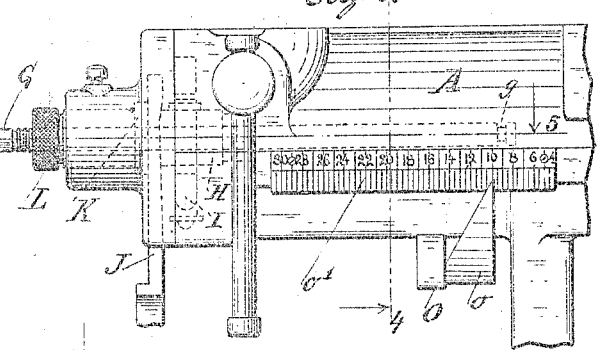
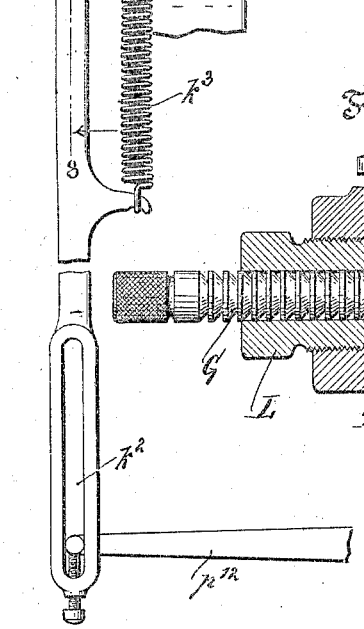
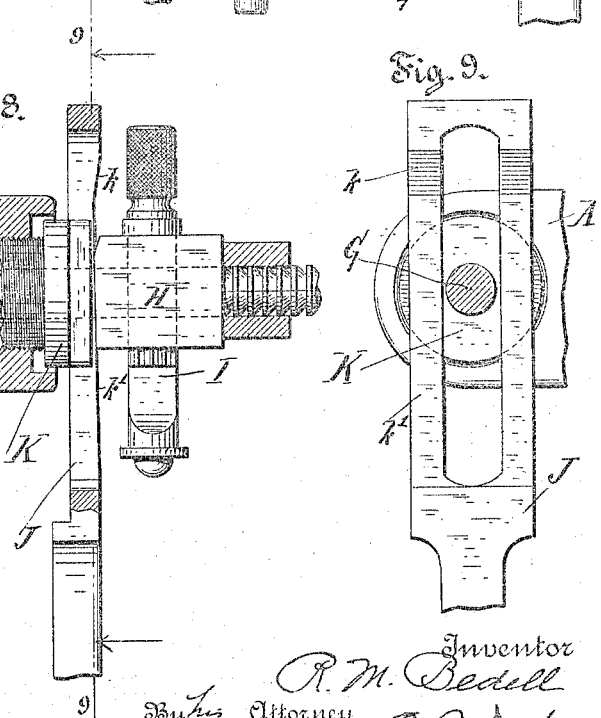
Witnesses
Inventor
R. M. Bedell
By his Attorney
P. T. Dodge

UNITED STATES PATENT OFFICE.

RICHARD M. BEDELL, OF NEW YORK, N. Y., ASSIGNOR TO MERGENTHALER LINOTYPE COMPANY, A CORPORATION OF NEW YORK.

LINOTYPE-MACHINE.

No. 816,841.     Specification of Letters Patent.     Patented April 3, 1906.

Application filed September 12, 1905. Serial No. 278,194.

*To all whom it may concern:*

Be it known that I, RICHARD M. BEDELL, of the borough of Brooklyn, city of New York, county of Kings, and State of New York, have invented a new and useful Improvement in Linotype-Machines, of which the following is a specification.

This invention relates to machines of the character shown in United States Patents Nos. 436,531 and 436,532, and has special reference to means for confining and releasing endwise the composed line of matrices.

In this class of machines represented by the commercial Mergenthaler linotype of the present day the composed line of matrices, including expansible wedge-spacers, is lowered to the casting mechanism in front of the mold and between two confining jaws or abutments, which limit the length of the justified line. The line as presented between the jaws is usually of less than the required length and its justification or elongation is effected by advancing the long wedges of the spacers through the line until it is expanded tightly between the jaws. The matrices while in casting position must be alined facewise by the pressure of the mold and vertically by the rise of the elevator in which the line is carried. These actions demand that the line shall be relieved from end pressure in order to reduce the friction between the matrices and permit them to move in relation to one another and the line finally confined again to the predetermined length. Heretofore this has been secured by means of a jaw-actuating screw-receiving motion from a pinion and a rack-bar actuated by one of the levers which moves the justifying wedges or spacers. In practice the wear of the screw and the other parts, the excessive strain to which they are subjected, and other causes result in the failure of the jaws to assume the precise position required and as a consequence the slugs are of improper length.

The present invention relates to a wedge mechanism for controlling the movable jaw to be incorporated in linotype-machines of the present commercial form without change in the cams or actuating-levers.

I have limited the drawings to those parts of the machine with which the invention is immediately associated. As to all other parts they may be of ordinary or any suitable construction.

Referring to the drawings, Figure 1 is an inside face view of the line-clamping jaws and attendant parts, commonly known as the "vise," in the position which they occupy when the composed line is presented between the jaws. Fig. 2 is a similar view with the parts at a later stage of the operation. Fig. 3 is a similar view with the parts in the position which they occupy when the line has been justified. Fig. 4 is a cross-section in the line 4 4 of Figs. 1, 2, 3, 5, and 7. Fig. 5 is a horizontal section in the line 5 5, Figs. 1, 6, and 7. Fig. 6 is an end elevation of the vise looking from the left side. Fig. 7 is a front elevation of the same. Fig. 8 is a vertical section in the line 8 8, Fig. 6. Fig. 9 is a section on line 9 9, Figs. 1 and 8.

Referring to the drawings, A represents the upper part of the stationary vise-frame forming a part of the main frame of the machine.

B and C are the two jaws for confining the matrix-line endwise. The jaw B is fixed normally in position; but the jaw C is sustained by the tongue on its side seated in the horizontal groove $a$ in the frame, so that the jaw may be moved forward and backward.

The composed line consists of matrices D and intermediate spacers or justifiers E, each consisting, as usual, of two oppositely-tapered wedges connected by a sliding joint, so that by moving the longer wedge past the shorter one held fast in the line the spacers may be increased in thickness at the operative point and the matrix-line thus elongated or justified tightly between the jaws to the predetermined length, as usual.

The matrix-line, sustained, as usual, on that part of the machine known as the "first elevator," is lowered to its position between the confining-jaws, as shown in Figs. 2 and 3, and while it is thus located the justifying, alining, and casting operations occur.

The present improvement has reference to means for supporting and adjusting the jaw-seat. The supporting means consist of a horizontal rod G, circumferentially toothed, seated at one end directly against the jaw C and extending thence outward through the block H, which is in turn connected rigidly, but adjustably, to the rod by a vertically-toothed pin I, which is extended downward through the block H in engagement with the teeth of the rod.

The block H, which serves as a rigid support for the rod G and as a means of moving the same endwise, is in its turn supported by a vertical wedge J, slotted vertically to straddle the rod and seated at its outer side against a rigid support. This support may be a bearing-surface on the main frame; but in order to compensate for the wear of parts and to permit very accurate adjustment of the jaw it is preferred to seat the outer side of the wedge against a bearing - piece K, seated against the end of a heavy tubular screw L, threaded into the main frame and loosely surrounding the rod G.

The wedge J is constructed, as shown, with two inclined or wedge surfaces $k$ and $k'$, the former at the upper end being short and abrupt, while the other is long and of gradual inclination or taper. The wedge is extended downward and slotted at its lower end $k^2$, as shown in Fig. 6, for connection with the lever ordinarily employed for operating the jaw - closing screw and the justifying - bar, this lever being designated $p^{12}$ in Patent No. 436,532.

A spring $k^3$ is extended from the arm on the wedge to the main frame, as shown in Fig. 6, so that it serves to drive the wedge upward whenever it is relieved from the downward action of the controlling-lever, being constantly urged upward by a spring and depressed at suitable intervals by a cam, as usual.

It will be observed that the piece K gives solid support to the block H and that the latter in turn supports the rod G, which gives direct support to the jaw C, these several parts standing directly behind the jaw and in the line in which pressure is applied thereto. When normal, the wedge stands in its lowermost position, as shown in Fig. 1, with its upper surface $k$ seated against the corresponding surface on block H. In this position of the parts, the wedge being in its lowermost position, the distance between the jaw C and its companion B is exactly equal to the length of the line required. While the jaws are in this position, the unjustified matrix-line of less than the final length is lowered between the jaws to the position as shown in Fig. 1. The wedge J then rises to the position shown in Fig. 2, slightly releasing the jaw C, but continues its upward movement until it arrives at the position shown in Fig. 3, in which position it again supports the jaw C in the same position as in Fig. 1.

When the line has been lowered between the jaws and the wedge is in the position shown in Fig. 1, the bar M rises in its inclined position, driving the spacing-wedges upward and effecting approximate justification of the line. The wedge J next rises sufficiently to relieve the jaw C and the matrix-line from pressure, as shown in Fig. 2, and the mold is at this time moved forward against the faces or edges of the matrices, thus effecting the alinement of the matrices facewise, while they are free, or substantially so, from friction on their side faces, and at the same time, or practically so, the usual elevator sustaining the matrix-line rises, so that the lower ears of the matrices are pressed against the edge of the mold, and this brings the characters into alinement horizontally. The wedge next rises still farther, bringing into action the lower surface $k'$, so that the line is again confined to the exact length required. While the line is thus confined, the bar M rises in a horizontal position, as shown in Fig. 3, again acting on the spacer-wedges and effecting the final justification of the line. The casting operation then takes place. The wedge descends momentarily to the position shown in Fig. 2, relieving the line from pressure, so that it may be lifted out from between the jaws for transferrence to the distributing mechanism. The wedges then descend to the first position, as shown in Fig. 1, preparatory to the entrance of the next line between the jaws.

It is to be particularly noted that during each of the justifying actions sustained by the line at the first and second level of the space-bands, which action occurs as in Patent No. 436,532, the jaws are firmly supported at a distance apart exactly equal to the length of the line required.

In order to change the measure or length of line, it is only necessary to lift the pin I until its teeth disengage from the rod G, which may then be moved forward or backward in relation to block H and again secured to the latter by pin I. This adjustment of the pin in relation to the supporting-block is the same as in United States patent to Rogers, No. 619,441.

I commonly construct the rod G with its teeth one-half em in length; but they may be varied in length at will. By turning the screw L, thereby changing the position of the support K, I am enabled to compensate for wear on parts and also to adjust the jaw for measures involving fractions of less than one-half an em. The wedge is provided in the present instance with two inclined surfaces simply in order that it may be used in connection with the operating cams and levers as now employed in the linotype-machine. In constructing new machines containing specially-designed cams the upper surface $k$ may be omitted and the necessary movements of block H effected by giving the proper upward or downward movement to the wedge and having only the surface $k'$.

In order to permit the operator to effect speedy adjustment of the jaw C for different measures without leaving his seat at the keyboard, I pivot to the jaw C a hand-lever O, such as shown in Figs. 4 and 5, curved downward and forward, so that it can be laterally grasped by the operator. I provide this lever with a pointer o, adapted to travel over a scale o', graduated to one-fourth ems and one-half ems and attached to the stationary frame, as shown in Figs. 4, 5, and 7. The inner end of this lever is notched, so that when its forward end is lifted it will enter the groove g in rod G. The pin I being first withdrawn to release the rod G, the adjustment of the jaw C and the rod may be instantly effected for any required measure by moving the lever laterally until the pointer arrives at the proper graduation on the scale, after which it is only necessary to lower the pin I into engagement with the rod.

Having described my invention, what I claim is—

1. In a linotype-machine the combination of the line-confining jaw, a rigid bearing and an intermediate sliding wedge acting to sustain the jaw in definite position and to release the same.

2. In a linotype-machine, the combination of the movable jaw to confine the matrix-line, a fixed bearing, and an intermediate mechanically-actuated wedge.

3. The combination of the line-confining jaw a mechanically-actuated wedge and an adjustable bearing for the wedge.

4. In a linotype-machine a movable line-confining jaw in combination with a mechanically-actuated wedge and an intermediate adjustable connection.

5. In a linotype-machine the combination of the movable jaw, the wedge, a rigid support therefor, a block bearing on the wedge and an adjustable rod connecting the block and the jaw.

6. In combination the jaw, the rod, the block secured to the rod and the wedge-bearing surfaces k and k'.

7. In a linotype-machine and in combination, the jaw, the toothed rod, the block, means adjustably connecting the rod and block, the wedge and the tubular screw sustaining the wedge.

8. In a linotype-machine matrices, expansible wedge-spacers, and jaws to confine the line in combination with means for adjusting the jaws to the length of the final line before and during a first expansion of the spacers, then releasing the jaw to permit alinement of the matrices, then restoring the original relation of the jaws prior to a second and final adjustment of the spacers.

In testimony whereof I hereunto set my hand, this 5th day of September, 1905, in the presence of two attesting witnesses.

RICHARD M. BEDELL.

Witnesses:
CHARLES WM. ANDERSON
GEORGE H. JONES.